(12) United States Patent
Hoffjann et al.

(10) Patent No.: US 8,019,464 B2
(45) Date of Patent: Sep. 13, 2011

(54) SORTING DEVICE AND METHOD FOR SORTING GOODS IN TRANSIT FOR AN AIRCRAFT

(75) Inventors: Claus Hoffjann, Hamburg (DE); Hansgeorg Schuldzig, Jork (DE)

(73) Assignee: Airbus Deutschland GmbH, Hamburg (DE)

( * ) Notice: Subject to any disclaimer, the term of this patent is extended or adjusted under 35 U.S.C. 154(b) by 1159 days.

(21) Appl. No.: 11/747,303

(22) Filed: May 11, 2007

(65) Prior Publication Data

US 2008/0128248 A1  Jun. 5, 2008

Related U.S. Application Data

(60) Provisional application No. 60/746,997, filed on May 11, 2006.

(30) Foreign Application Priority Data

May 11, 2006  (DE) .......................... 10 2006 022 144

(51) Int. Cl.
   *G06F 7/00* (2006.01)
(52) U.S. Cl. ........................................ 700/223; 700/228
(58) Field of Classification Search .................. 700/223, 700/224
   See application file for complete search history.

(56) References Cited

U.S. PATENT DOCUMENTS

| 4,218,034 | A  | * | 8/1980 | Magill ....................... 244/114 R |
| 5,793,639 | A  | * | 8/1998 | Yamazaki ..................... 700/226 |
| 6,557,724 | B1 | * | 5/2003 | LeCroy et al. .................. 221/76 |
| 6,874,735 | B1 |   | 4/2005 | Audyli |
| 2003/0219329 | A1 | * | 11/2003 | Ganiere ........................ 414/399 |
| 2005/0056576 | A1 | * | 3/2005 | Koini et al. .................... 209/630 |
| 2010/0018839 | A1 | * | 1/2010 | Tan ............................... 198/507 |

FOREIGN PATENT DOCUMENTS

| DE | 1556598       |    | 2/1970 |
| DE | 102005026898 | A1 | 1/2006 |
| WO | 2005002999   | A1 | 1/2005 |
| WO | 2006074208   | A1 | 7/2006 |

* cited by examiner

*Primary Examiner* — Ramya Prakasam
(74) *Attorney, Agent, or Firm* — Christopher Paradies; Fowler White Boggs P.A.

(57) ABSTRACT

A sorting device and a method for sorting goods in transit for an aircraft are disclosed. The sorting device includes a sorting region with a sorting unit and a storage region. The sorting region is adapted such that goods in transit are capable of being provided to the sorting region in an undetermined first arrangement. The sorting region includes a longitudinal axis, where a sorting unit may be moved along the longitudinal axis of the sorting region. The sorting unit is capable of sorting the goods in transit from an undetermined first arrangement to a predetermined second arrangement, where the goods in transit may be provided in the predetermined second arrangement in the storage region.

21 Claims, 5 Drawing Sheets

SORTING DEVICE AND METHOD FOR SORTING GOODS IN TRANSIT FOR AN AIRCRAFT

REFERENCE TO RELATED APPLICATIONS

This application claims the benefit of the filing date of German Patent Application No. 10 2006 022 144.3 filed May 11, 2006 and of U.S. Provisional Patent Application No. 60/746,997 filed May 11, 2006, the disclosures of which applications are hereby incorporated herein by reference.

FIELD OF THE INVENTION

The field relates to a sorting device and a method for sorting goods in transit for an aircraft, for example, a pressure cabin of an aircraft.

BACKGROUND OF THE INVENTION

In today's passenger aircraft, passengers are allowed to carry small items of goods in transit, so-called hand luggage, with them into the passenger compartment of the aircraft. Due to safety provisions, passengers may stow such hand luggage only underneath the seat in front of them or in an overhead storage device, a so-called overhead bin or hat rack, that has been allocated to them.

During the phase of boarding the aircraft, passengers may store their hand luggage but this often results in extended waiting periods because a passenger blocks the aisle when loading the hat rack, i.e., an overhead baggage compartment, forcing the remaining passengers to wait.

Apart from stowing items of hand luggage of passengers, prior to the boarding phase it is necessary to stow consumable products, for example, drinks for in-flight service. These items are stored in trolleys, and are stored in the aircraft in dedicated locations, namely in the galleys. Loading and unloading trolleys is handled by the ground crew who unload the empty trolleys and load the filled trolleys by way of the aircraft entrances. Among other things, this may prolong the time on the ground during the flight phases of an aircraft.

SUMMARY OF THE INVENTION

According to an embodiment, a sorting device for sorting goods in transit for an aircraft is provided. The sorting device comprises a sorting region with a sorting unit and a storage region. The sorting region comprises a longitudinal axis, wherein the sorting unit may be moved along the longitudinal axis of the sorting region. The sorting region is adapted such that goods in transit are capable of being provided to the sorting region in an undetermined first arrangement. The sorting unit is equipped to sort the goods in transit from an undetermined first arrangement to a predetermined second arrangement, wherein the goods in transit are provided in the predetermined second arrangement in the storage region.

According to an embodiment, a method for sorting goods in transit for an aircraft is provided. Goods in transit are provided in an undetermined first arrangement in a sorting region. A sorting unit is moved along the longitudinal axis of the sorting region, wherein the goods in transit are sorted from the undetermined first arrangement to a predetermined second arrangement along the longitudinal axis by the sorting unit. Finally the goods in transit are provided in the predetermined second arrangement in a storage region.

According to an embodiment, a sorting device with the characteristics described above is used in an aircraft.

During the boarding phase of a passenger aircraft, all the passengers may stow their hand luggage in overhead storage devices provided for this purpose, or under the seat. This may result in considerable delays because the aisle is blocked while a passenger stows an item of hand luggage. With the sorting device, the hand luggage or other goods in transit that have to be stowed in the pressurised pressure cabin is automatically and independently conveyed to the stowage location allocated to it, where it is made available. Passengers may place their goods in transit in a sorting region and may directly proceed to their seat without being impeded by the stowing activities of other passengers. The hand luggage may be placed in the sorting region in a random undetermined first arrangement or order. A sorting unit that may be moved at the sorting region may take up the goods in transit, for example, the hand luggage, and sort it into a predetermined defined second arrangement. The second arrangement may correspond to the order in which the goods in transit are to be stowed in the loading region. The arrangement along the hat racks of the seat rows of an aircraft may be any exemplary order. For example, if a passenger with a seat allocation in row X of an aircraft places his/her hand luggage onto the sorting unit, then the sorting unit sorts the goods in transit such that when the goods in transit are made available in the storage region, the hand luggage of the passenger may be stored at the position of row X. This may prevent blockage of the aisles by lengthy stowage of the hand luggage. Nevertheless, the passenger may have access to his/her luggage in the hat rack.

The transport units may comprise belt conveyors or chain conveyors. For vertical conveyance, various lift systems or vertical conveyors, for example, chain conveyors, that comprise transport platforms for accommodating the goods in transit may be used for vertical conveyance of the goods in transit.

The storage region may be arranged in an overhead storage device, in a floor region, for example, underneath passenger seats in an aircraft, or in service facilities, such as, for example, the galleys of an aircraft. In this arrangement, the storage region is capable of being vertical or horizontal.

The term "first undetermined arrangement" may refer to a random first arrangement or a number of goods in transit, one item behind another, along a longitudinal axis. The term "predetermined second arrangement", for example, describes a defined and predefinable order of the goods in transit along a longitudinal axis.

According to an embodiment, the sorting device further comprises a transport region with a transport unit, wherein the transport unit is capable of conveying the goods in transit from the sorting region to the storage region. Due to a spatial difference between the sorting region and the storage region, the sorted items of luggage in the second predetermined arrangement may be transported to the storage region. For this reason, a connection between the sorting region and the storage region may be provided by the transport region. Along the transport region, the transport unit may ensure that the sorted goods in transit are conveyed from the sorting region to the storage region. In this way, the sorting region and the storage region may be provided in separate positions, located separately from each other, so that the sorting region may be flexibly adapted to different installation locations.

According to one embodiment, the transport region further comprises a vertical conveying device, wherein the vertical conveying device is adapted for vertically conveying the goods in transit. Due to the planes of the sorting region and of the storage region, where the planes are often arranged differently in the vertical axis or z-axis of an aircraft, it may be necessary to additionally convey the goods in transit vertically by vertical conveying devices. By these vertical conveying devices, each storage region of an aircraft may be reached.

The term "vertical" refers to any direction other than a horizontal plane. For example, the term "vertical" may refer to a direction that differs from the x-axis of an aircraft, or the horizontal plane of a fuselage. In other words, the term "vertical conveying unit" refers to a transport unit that may convey goods in transit along an ascending or descending gradient.

According to an embodiment, the sorting device further comprises a take-up unit. The take-up unit is capable of taking up the goods in transit and provide them to the sorting region. If the sorting region, for example, is in an inaccessible location, the take-up unit is capable of providing a take-up region for the goods in transit, wherein subsequently the goods in transit are conveyed from the take-up region to the sorting region by a transport unit. In this example, the sorting region including the sorting unit may be arranged in a location that is favourable from a design point of view, although access for passengers to place their items of luggage may not be possible at that location. By the take-up region, an improved design and arrangement of the sorting region may become possible.

According to an embodiment, the sorting device additionally comprises a sensor unit. The sensor unit is capable of measuring characteristics of the goods in transit. For example, if a passenger hands over his/her luggage at the take-up unit, the sensor unit may immediately determine the weight or the size of the goods in transit. These measured values for example, may be used to calculate the center of gravity position of the aircraft or to calculate the total weight. Furthermore, aircraft settings, may be better adjusted.

According to an embodiment, the sorting device comprises a plurality of transport containers to accommodate the goods in transit. In this example, the goods in transit may not have to be placed directly on the sorting region but instead may be placed into the transport containers. In this example, the goods in transit may be better protected against soiling and damage during the sorting and transport procedures.

According to an embodiment, the sorting device comprises a control unit. The control unit is capable of controlling the sorting device. With this control unit, there is an option of flexibly varying the predetermined second arrangement. Any possible sorting order of the goods in transit may be determined. With the control unit, it may also be possible to arrange place holders between the goods in transit. If the goods in transit, for example, are sorted in the order according to the seat arrangement of the passengers, if there is an unoccupied seat row the control unit may insert a placeholder between two items of goods in transit such that no item of goods in transit is allocated to the loading region or to the hat rack above the unoccupied seat position. In this way for each seat configuration and seat allocation, the intended goods in transit may be provided in the storage region.

According to an embodiment, the control unit is equipped for controlling the transport unit. In this example, the speed of the transport unit may be controlled or, if the transport unit comprises a junction, the points of the junction of the transport unit or units, may be controlled.

According to an embodiment, the control unit further comprises an input unit. The input unit is adapted such that a predetermined second arrangement of the goods in transit may be entered. For example, with the input unit, various second arrangements of the goods in transit may be predetermined for the control unit. Furthermore, the input unit may be equipped such that information may be read in, by which information the control unit makes an allocation of the goods in transit. For example, a passenger may hand over his/her item of luggage, wherein the input unit scans the information contained on the boarding pass. Based on the passenger's seat allocation information contained on the boarding pass, the control unit may then control the sorting unit such that in the predetermined second arrangement the item of luggage is correctly sorted. Subsequently, the transport unit conveys the item of luggage to the intended position in the storage compartment, where the position tallies with the passenger seat row. Thus, the sorting device may sort or stow the goods in transit entirely automatically and independently. A complicated and time-consuming manual input procedure of the information may be avoided.

According to an embodiment, the storage region is selected from the group consisting of a luggage compartment, an underfloor region, a galley and a hat rack. Apart from the luggage compartments that are arranged in the overhead baggage compartment region, also known as hat racks or stowage bins, the storage region in the foot region of the passengers or below the aircraft floor may be arranged. Passengers may then access their items of luggage through floor flaps. The sorting device may thus be of a simpler design since the distance between the sorting region and the storage region would be shorter. Furthermore, by the sorting device, the trolleys of the service facilities or galleys could be loaded. For example, apart from hand luggage, the goods in transit may also comprise food- or drink containers that are placed onto the sorting region in an unsorted first arrangement, and subsequently are provided to the galleys in the predetermined second, i.e. sorted, arrangement. The turn-around times, i.e. the periods of time between the flights, in which periods of time the aircraft has to be loaded, may thus be shortened. A steward may select goods in transit by way of an input, for example, in the galley, and the sorting device may subsequently select and sort the selected goods in transit from a non-sorted first arrangement such that the goods in transit are available to the storage region, for example, the galley, and thus to the steward. Stewards may thus place individual orders from customers such that the ordered goods in transit are provided automatically without any manual searching.

According to an embodiment, the sorting device, further comprises a plurality of sorting units. By the plurality of sorting units, the sorting process in the sorting region may be accelerated. Furthermore, a host of different sorting algorithms that may improve the sorting process may be used.

According to an embodiment, the sorting device is capable of sorting the goods in transit from the undetermined first arrangement to a predetermined second arrangement by selective sorting. The term "selective sorting" refers to a sorting method in which the sorting device takes up goods in transit and places them in the position intended, until such time as all the goods in transit are sorted in the predetermined second arrangement. With the use of a sorting unit in the undetermined first arrangement of the goods in transit, a placeholder may be necessary in which at least one item of the goods in transit may be parked. In the case of a plurality of sorting units it may not be necessary to provide a placeholder. The sorting units may take up an item of goods in transit and place it at the predefined position in the sorting region.

According to an embodiment, the sorting device is capable of sorting the goods in transit from the undetermined first arrangement to a predetermined second arrangement by sorting by pairs. In the case of "sorting by pairs," the sorting unit takes up two items of goods in transit and changes, e.g., by rotation by 180 degrees, the position of the two taken-up items of goods in transit. This procedure may continue with the goods in transit until such time as a predetermined second arrangement of the goods in transit exists. No second sorting unit may be required in sorting by pairs.

According to an embodiment, the sorting device further comprises a plurality of transport units. With the plurality of transport units, the goods in transit may be conveyed from one or several sorting regions to a plurality of storage regions. If, for example, one storage region is in a hat rack on the right-hand side of the fuselage, while the other storage region is in on the left-hand side of the fuselage, either of the storage regions may receive the goods in transit. By the plurality of transport units, various horizontal planes of an aircraft may also be accessed. By a combination of the plurality of transport units, the goods in transit may thus be conveyed to any position in the storage regions, for example, in the storage regions of an aircraft. This may be particularly advantageous for in modern multi-story large volume aircraft.

According to an embodiment, the storage region and the sorting region may be provided integrally. The sorting region may thus be arranged in the same region as the storage region so that the goods in transit may be sorted directly on site, i.e., in the storage region. Thus, for example, in an aircraft, the sorting region with the sorting units may be arranged directly in the overhead storage device (hat rack) such that the items of hand luggage are sorted directly in the hat rack. In this example, the size of the installation may be reduced. This may improve the use of available space particularly closely confined regions in an aircraft, for example.

According to an embodiment, the sorting device is arranged in an aircraft. With an arrangement of the sorting device in an aircraft non-sorted goods in transit may be sorted and provided in a targeted manner and sorted to various storage regions of an aircraft.

According to an embodiment, the storage region is arranged in a region within the aircraft, wherein the sorting region and the sorting unit may be arranged in a region outside the aircraft. Passengers may thus hand over their goods in transit already outside the aircraft. Subsequently, the goods in transit, which have been handed over non-sorted, are sorted in the sorting region and by the transport unit in the transport region are conveyed in a targeted manner to a storage region in the aircraft. A passenger, for example, who has handed over his/her hand luggage in the airport, will subsequently meet up with it again in the overhead storage devices at his/her seat. This avoids any delays, as a result of passengers stowing their items of luggage, during the phase of boarding the aircraft.

Furthermore, according to a further embodiment, the take-up unit may be arranged in a region outside the aircraft. At the take-up unit outside the aircraft, the items of luggage may be handed over, and subsequently they may, be conveyed to a sorting unit within the aircraft.

The embodiments of the sorting device also apply to the method and to the use and vice-versa.

According to an embodiment of the method, the goods in transit are conveyed from the sorting region to the storage region by a transport unit.

According to an embodiment of the method, the goods in transit are conveyed vertically by a vertical conveying unit.

According to an embodiment of the method, the goods in transit are taken up by a take-up unit, and the goods in transit are made available at the sorting region.

According to an embodiment of the method, the characteristics of the goods in transit are measured by sensor units of the take-up unit.

According to an embodiment of the method, the sorting unit is controlled by a control unit.

According to an embodiment of the method, the transport unit is controlled by the control unit.

According to an embodiment of the method, by an input unit, a predetermined second arrangement of the goods in transit is entered.

With the embodiments of the sorting device and the sorting method, goods in transit may quickly be conveyed to the intended storage region. Passengers no longer may have to undertake the time-consuming stowage of items in hat racks, such that the phase of boarding an aircraft may take place more speedily. Furthermore, in this way, passenger convenience and satisfaction may be enhanced because extended waiting periods during boarding of the aircraft may be shortened. Furthermore, service items, for example for in-flight catering, may be brought on board more quickly such that the turn-around times of the aircraft may be reduced. Furthermore, during a flight, personnel on board may provide the service items more quickly in the galleys, such that the in-flight service in an aircraft may be improved.

Among other things, it may be an object of the sorting device to improve the loading and unloading times of an aircraft.

BRIEF DESCRIPTION OF THE FIGURES

Below, for further explanation and for an improved understanding the present embodiments are described in more detail with reference to the drawings. The following are shown.

Identical or similar components in different figures have the same reference characters. The illustrations in the figures are diagrammatic and not to scale.

DETAILED DESCRIPTION

The examples described and drawings rendered are illustrative and are not to be read as limiting the scope of the invention as it is defined by the appended claims.

Figure 1:
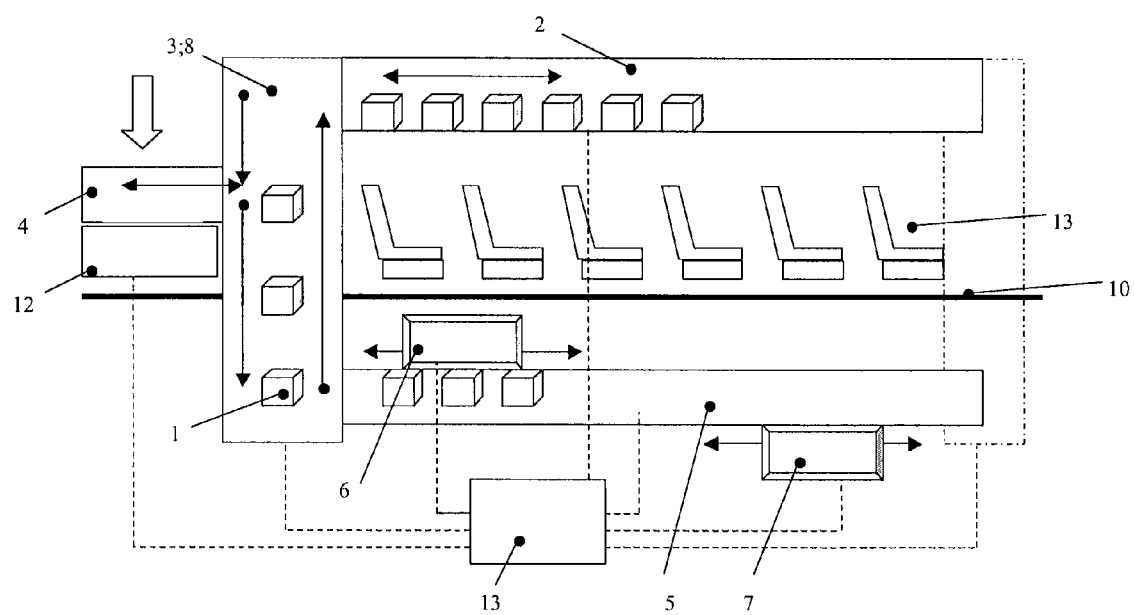
FIG. 1 shows a diagrammatic representation of an embodiment of the sorting device.

FIG. 1 shows an embodiment of the sorting device that comprises a sorting region 5 with a sorting units 6,7 and a storage region 2. The sorting region 5 is adapted such that goods in transit 1 may be made available to the sorting region 5 in an undetermined first arrangement. The sorting unit 5 comprises a longitudinal direction along which the sorting units 6,7 may be moved. The sorting units 6,7 are capable of sorting the goods in transit 1 from the undetermined first arrangement to a predetermined second arrangement. The goods in transit 1 may be made available in this predetermined second arrangement to the storage region 2.

FIG. 1 also shows a transport region 3 that comprises at least one transport unit 8. The transport region 3 conveys the sorted goods in transit 1 from the sorting region 5 to the storage region 2. As shown in FIG. 1, the transport region 3 may not only provide a horizontal direction of conveyance but also a vertical direction of conveyance. In the case of a horizontal direction of conveyance, for example, belt conveyors or chain conveyors may be used. For vertical conveyance, vertical conveyors, for example, chain conveyors which comprise transport platforms for accommodation of the goods in transit 1 in order to convey them vertically may be used. For protection and for simpler conveyance of the goods in transit 1, the goods in transit 1 may additionally be accommodated in transport containers. These transport containers may then be conveyed loosely on a belt conveyor or may be attached to fixed positions on a chain conveyor.

The goods in transit may be handed over either directly at the sorting region 5 or at a take-up unit 4. If the goods in transit 1 are handed over at the take-up unit 4, the goods in transit 1 may, for example, be conveyed to the sorting region 5 by the transport unit 8. In this arrangement, the goods in transit 1 may be handed over in a first random arrangement at the take-up unit 4 or in the sorting region 5.

The goods in transit 1 are sorted in the sorting region 5 by a sorting unit 6 or as shown in FIG. 1, by two sorting units 6 and 7. In this arrangement, the sorting units 6, 7 may, for example, be moved on both sides of the sorting region 5 in its longitudinal direction, and, by take-up and hand-over of single or multiple items of goods in transit 1, may arrange a predetermined defined second arrangement of the goods in transit 1.

For sorting, each sorting units 6,7 accommodates one or two items of goods in transit 1 or transport baskets, and changes the position of the goods in transit or the transport baskets according to the principle of, for example, sorting by pairs or selective sorting:

a) Sorting by Pairs:

When sorting by pairs, a sorting units 6,7 may be used. In one arrangement, the sorting units 6,7 may grip two adjacent items of goods in transit 1 at the same time, and for the purpose of re-sorting, may turn by 180 degrees such that the order of the goods in transit is reversed. In this arrangement, the sorting units 6,7 may move to and from along the sorting region 5, or it may move from the beginning of the chain to the end, and step-by-step it may take up two transport baskets for changing over their positions. In the following example, the new positions after the change-over are indicated by square brackets [ ]:

First Pass of the Sorting Units 6,7

| Start of the sequence: | 1 5 4 2 3 |
|---|---|
| First change-over: | [5 1] 4 2 3 |
| Second change-over: | 5 [4 1] 2 3 |
| Third change-over: | 5 4 [2 1] 3 |
| Fourth change-over: | 5 4 2 [3 1] |

Second pass of the Sorting Units 6,7

| No change-over: | [5 4] 2 3 1 |
|---|---|
| No change-over: | 5 [4 2] 3 1 |
| Fifth change-over: | 5 4 [3 2] 1 |

The pass is complete when the goods in transit 1 are in the predetermined defined second arrangement. Since in the case of sorting by pairs, only one sorting unit is required, this method may be used in particularly confined spaces (e.g. in the hat rack of an aircraft).

b) Selective Sorting

In this procedure, for example, the sorting unit 6 takes up the goods in transit 1 (No. 2), while the sorting unit 7 takes up the goods in transit 1 (No. 6), etc. The goods in transit are then gradually placed in the intended second arrangement no. 1 2 3 4 5 6. These new positions are indicated by square brackets [ ]:

| First undetermined arrangement: | 2 3 1 5 6 4 |
|---|---|
| First displacement: | [6] 3 1 5 [2] 4 |
| Second displacement: | 6 [5] 1 [3] 2 4 |
| Third displacement: | 6 5 [4] 3 2 [1] |

If a placeholder is provided in the sorting region, one sorting units 6,7 may be enough to provide selective sorting. When using several sorting units 6, 7 there is no need to provide a placeholder such that the goods in transit 1 may be sorted from a tightly packed chain.

FIG. 1 further shows a control unit 13 by which a host of different elements of the sorting device may be centrally controlled. In this arrangement, the sorting device may control the sorting units 6, 7, the transport units 8 and/or placement in the storage region 2. Furthermore, various sorting algorithms may be set by the control unit 13.

The sorting algorithm may be specified so as to be fixed or so as to be variable by the control unit 13 and the input unit 12. In this arrangement, the sorting units 6, 7 may move to and from along the sorting region 5, or they may drive along the sorting region 5 in one direction of movement.

FIG. 1 further shows an input unit 12. On the input unit 12, a particular sorting algorithm or the second predetermined arrangement may be entered. This information may subsequently be provided to the control unit 13 such that the control unit 13 controls the sorting device accordingly. At the input unit 12, the information may be provided by a keyboard or by automatic input methods. In this arrangement, the information may relate to characteristics of the goods in transit, for example, the weight of the goods in transit, the position of the storage region or the predetermined second arrangement or the sorting algorithms. The term "automatic input methods," for example, may comprise scanners, light barriers or RFID (radio-frequency identification) units. A scanner may scan the boarding pass of a passenger such that the information relating to the target position of the handed-over goods in transit 1 in the storage region 2, for example, the seat row 13 may be provided to the sorting device. By the RFID technique, by transponders associated with the goods in transit, information about the goods in transit 1 may be provided. Furthermore, the light barriers, for example, may read a bar code on the goods in transit 1, such that the information may be read in.

In the embodiment shown in FIG. 1, a passenger may thus hand over his/her items of luggage 1 in a transport basket in the take-up unit 4 when s/he enters the aircraft. This transport basket, for example, is marked with the seat position by way of scanning the boarding pass. Thereafter, the transport basket is displaced along the sorting region 5 by a vertical conveyor 8 in the transport region 3. Subsequently, a transport unit 8 releases the next empty transport basket 1 in exchange for the basket at the take-up unit 4. In this way, an uninterrupted chain of transport baskets is created, where the baskets are buffered in the sorting region 5 in a non-sorted first arrangement. Sorting according to the seat positions is carried out by the two sorting units 6, 7 or by only one sorting units 6,7 according to a sorting algorithm for sorting by pairs or for selective sorting, as explained above. After the sorting procedure, the entire transport chain of the goods in transit 1 may be displaced to the hat rack 2 by way of the vertical conveyor 8.

At their allocated seats, the passengers then may meet up with their own items of luggage 1 in the transport basket allocated to them.

Figure 2:
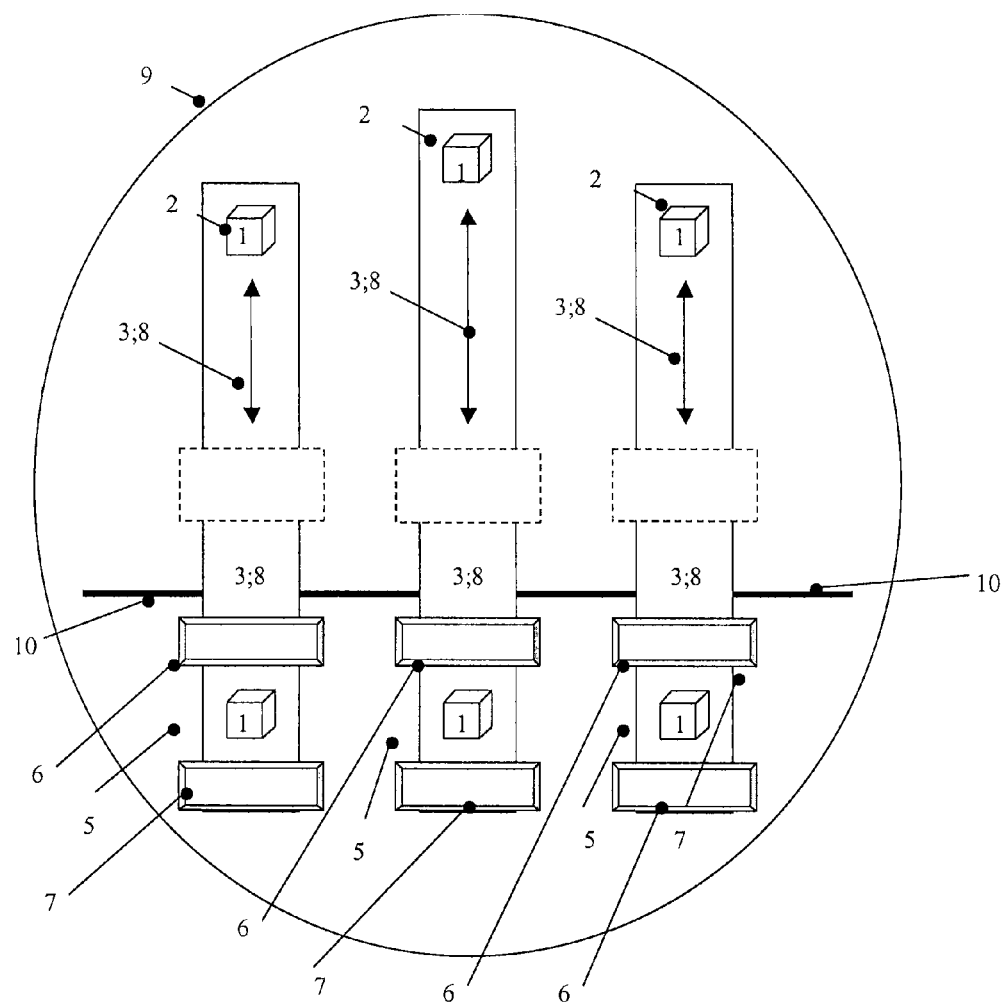
FIG. 2 depicts a diagrammatic representation of an embodiment of the sorting device, showing several sorting regions, transport regions and storage regions in an aircraft cross section.

FIG. 2 shows a cross section of the fuselage of an aircraft which comprises a sorting device. In this arrangement, the seats of the cabin of the aircraft are arranged such that each seat row is separated by two aisles. Storage regions 2, so-called hat racks, are arranged above the right-hand, middle and left-hand seat groups. Each of these hat racks is connected with an associated transport unit 8 comprising an associated sorting region 5 such that the items of hand luggage of the passengers may be conveyed between the sorting regions 5. Two sorting units 6, 7 are associated with each sorting region 5, where the sorting units 6, 7 may sort the items of luggage from a non-sorted first arrangement to a predetermined second arrangement. The items of luggage 1 sorted in this way may then be made available, by the transport units 8, to the storage region 2 of the associated seat row 13. In this arrangement the sorting regions are underneath the floor 10 of the aircraft. The various transport regions 3, the sorting regions 5 or the storage regions 2 may be connected by a connection such that goods in transit 1 may be exchanged between the rows. The connections, may be implemented by way of switch point members of the transport units 8. Belt conveyors may, for example, comprise switch point members that interconnect the various transport regions 3. The switch point members may be controlled by the control unit 13.

Figure 3:
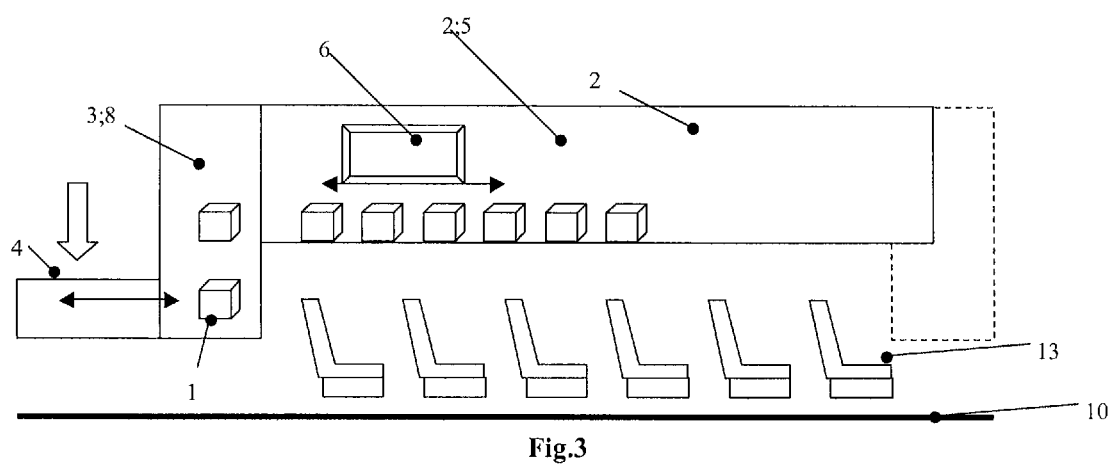
FIG. 3 illustrates a diagrammatic representation of an embodiment of the sorting device in which a sorting region, a transport region and a storage region are arranged.

FIG. 3 shows an application and arrangement, of the sorting device in an aircraft with a pressure cabin with only one sorting unit 6. In this arrangement, the sorting region 5 and the storage region 2 form an integral part, i.e. the storage region 2 and the sorting region 5 are both arranged, for example, in the hat rack. In this way, the space requirements of the sorting device may be reduced. FIG. 3 also shows the take-up unit 4, which may be arranged in the aircraft or outside the aircraft. If the take-up unit 4 is arranged outside the aircraft 9, a passenger may hand over his/her items of hand luggage 1 already outside the aircraft 9 so that blockages during the phase of boarding an aircraft 9 may be reduced because the passengers may reach their allocated seat 11 directly without any delay.

Figure 4:
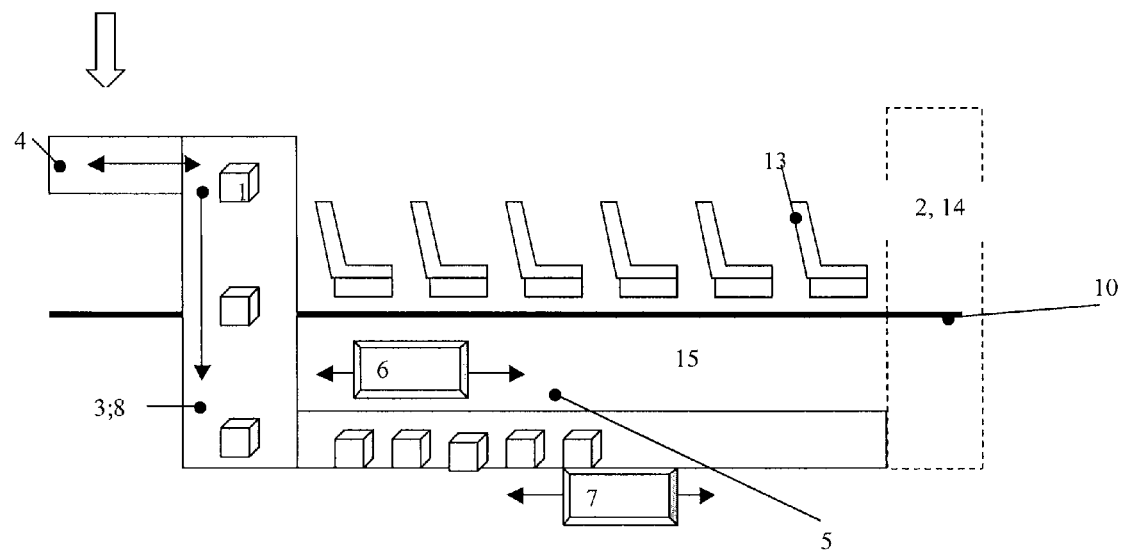
FIG. 4 shows a diagrammatic representation of an embodiment of the sorting device in which the sorting device sorts the service facilities or galleys of an aircraft.

FIG. 4 shows a further embodiment. With the sorting device shown in FIG. 4, in an aircraft 9 with pressure cabin the storage of food packages, foodstuffs as well as requisites and consumables may be sorted by selective sorting and optionally by sorting by pairs, and may be provided to the storage regions 2, for example the galleys 14. On a take-up unit 4, which is arranged inside or outside an aircraft 9, the goods in transit 1 may be handed over. Transport units 8 of the transport region 3 convey these goods in transit 1 to the sorting region 5. The one or several sorting units 6, 7 sort the goods in transit 1. Subsequently, the goods in transit may be provided to a service facility 14 of an aircraft. From these service facilities 14 or galleys, stewards may then remove the goods in transit 1 and further process them. For example, foodstuffs or drinks may be made available to a steward as required. Moreover, the sorting device may comprise an intermediate storage region 15 in which the sorted goods in transit 1 may be placed into intermediate storage until, a steward from the galley 14, for example, calls up the required goods in transit 1. By the transport units 8, the goods in transit 1 may be conveyed from the intermediate storage region 15 to the galley 14. Furthermore, the goods in transit 1, for example waste or used food trays may be conveyed back into the intermediate storage region 15. In this way, the number of galleys 14 may be reduced because already used goods in transit 1 may be conveyed back to the intermediate storage region 15 such that the galley 14 is not full of used goods in transit. In this way, the space required in the galleys 14 may be reduced.

Figure 5:
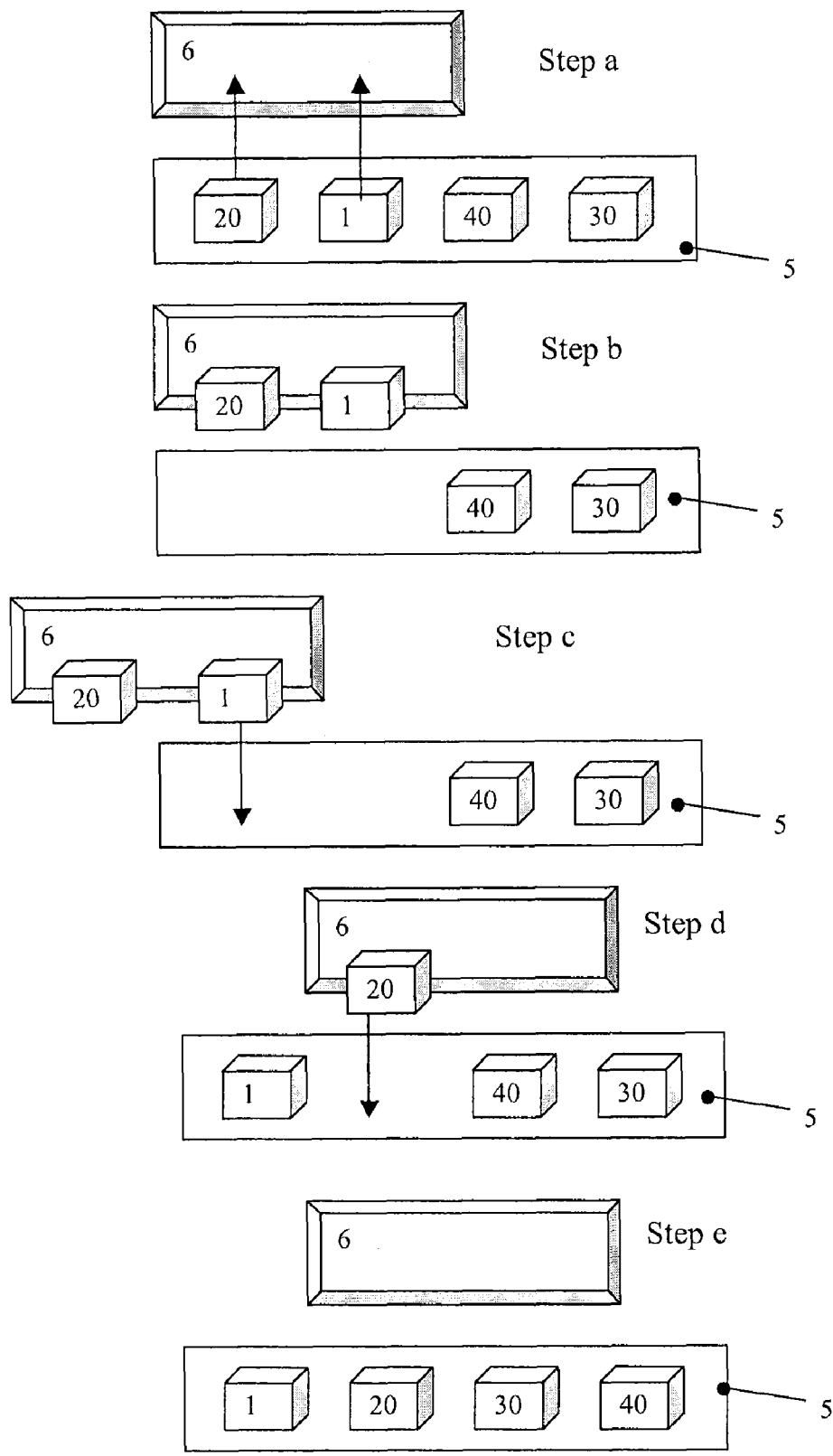
FIG. 5 depicts a diagrammatic sequence of a sorting procedure.

FIG. 5 shows an embodiment of a sorting sequence in the sorting region 5. In this arrangement, the sorting region 5 comprises a sorting unit 6 which may accommodate two items of goods in transit 1, 20, 30, 40. Initially the goods in transit 1, 20, 30, 40 are present in a non-sorted first arrangement 20, 1, 40, 30. In a first step a, the sorting device moves to the start of the sorting region 5 where it takes up the goods in transit 20, 1. In step b, the sorting unit 6 moves to a position in which the goods in transit 1 may be handed over at the position provided for them in the sorting region 5. In step c, the sorting unit 6 hands over the goods in transit 1 provided for them in the sorting region 5. In step d, the sorting unit 6 hands over the goods in transit 20 at the position provided for them in the sorting region 5. The sorting device 6 repeats this until, as shown in step e, the goods in transit 1 are provided in the predetermined arrangement in the sorting region 5 and may subsequently be provided to the storage region 2.

It should also be mentioned that "comprising" does not exclude any other elements or steps, and that "a" or "an" does not exclude a plurality. It should furthermore be noted that characteristics or steps described with reference to one of the above embodiments may also be used in combination with other characteristics or steps of other above-described embodiments. The reference characters in the claims should not be understood in a restrictive sense.

Alternative combinations and variations of the examples provided will become apparent based on this disclosure. It is not possible to provide specific examples for all of the many possible combinations and variations of the embodiments described, but such combinations and variations may be claims that eventually issue.

LIST OF REFERENCE CHARACTERS

1 Goods in transit
2 Storage region
3 Transport region
4 Take-up unit
5 Sorting region
6 Sorting unit
7 Sorting unit
8 Transport unit
9 Aircraft
10 Floor
11 Seats, seat row
12 Input unit
13 Control unit
14 Storage region for service facilities (galley)
15 Intermediate storage region
20 Goods in transit
30 Goods in transit
40 Goods in transit

What is claimed is:

1. A passenger aircraft, the passenger aircraft being capable of using a sorting device, wherein the sorting device comprises a sorting region, the sorting region comprising a sorting unit adapted for sorting goods in transit and a longitudinal axis, wherein the sorting unit is moveable along the longitudinal axis of the sorting region, the passenger aircraft comprising:
    a passenger cabin capable of accommodating passengers;
    a transport unit; and
    a storage region in the passenger aircraft;
      wherein the sorting device is adapted such that goods in transit are conveyed to the storage region in a predetermined arrangement using the transport unit and are accessible by passengers travelling in the passenger cabin of the aircraft.

2. The passenger aircraft of claim 1, wherein the transport unit further comprises a vertical conveying unit,
wherein the vertical conveying unit is adapted for vertically conveying the goods in transit.

3. The passenger aircraft of claim 1, further comprising a take-up unit,
wherein the take-up unit is adapted for taking up the goods in transit and providing the goods in transit to the sorting region.

4. The passenger aircraft of claim 1, further comprising a sensor unit;
wherein the sensor unit is equipped such that characteristics of the goods in transit are measurable.

5. The passenger aircraft claim 1, further comprising a plurality of transport containers to accommodate the goods in transit.

6. The passenger aircraft of claim 1, further comprising a control unit;
wherein the control unit is adapted such that the sorting unit is controllable.

7. The passenger aircraft of claim 6, wherein the control unit is adapted such that the transport unit is controllable.

8. The passenger aircraft of claim 6, wherein the control unit further comprises an input unit,
wherein the input unit is adapted for entering the predetermined arrangement of the goods in transit.

9. The passenger aircraft of claim 1, wherein the sorting device is adapted for sorting the goods in transit from an undetermined arrangement to the predetermined arrangement by selective sorting.

10. The passenger aircraft of claim 1, wherein the sorting device is adapted for sorting the goods in transit from an undetermined arrangement to the predetermined arrangement by sorting by pairs.

11. The passenger aircraft of claim 1, further comprising at least one additional transport unit, wherein the goods in transit are conveyed to the storage region in the predetermined arrangement using the transport unit and the at least one additional transport unit.

12. The passenger aircraft of claim 1, wherein the storage region and the sorting region are provided integrally.

13. The passenger aircraft of claim 12, wherein the sorting region comprises a plurality of sorting units.

14. The passenger aircraft of claim 1, wherein, and the sorting region is arranged in a region outside the passenger aircraft.

15. A method for sorting goods in transit for the passenger aircraft of claim 1, comprising:
providing the goods in transit in an undetermined first arrangement in a sorting region;
moving a sorting unit along a longitudinal axis of the sorting region;
sorting the goods in transit from the undetermined first arrangement to a predetermined second arrangement along the longitudinal axis via the sorting unit; and
conveying the goods in transit in the predetermined second arrangement using the transport unit of the passenger aircraft to the storage region in the passenger aircraft, such that the goods in transit are accessible by passengers located in the passenger cabin of the passenger aircraft.

16. The method of claim 15, further comprising:
vertically conveying the goods in transit by a vertical conveying unit disposed in the passenger aircraft.

17. The method of claim 15, further comprising:
taking up the goods in transit by a take-up unit; and
providing the goods in transit in the sorting region.

18. The method of claim 15, further comprising:
measuring characteristics of the goods in transit by a sensor unit.

19. The method of claim 15, further comprising:
controlling the sorting unit by a control unit.

20. The method of claim 15, further comprising:
controlling the transport unit using a control unit.

21. The method of claim 15, further comprising:
entering a predetermined second arrangement of the goods in transit by using an input unit.

* * * * *